(12) United States Patent
Weise et al.

(10) Patent No.: US 10,452,896 B1
(45) Date of Patent: Oct. 22, 2019

(54) TECHNIQUE FOR CREATING AVATAR FROM IMAGE DATA

(71) Applicant: Apple, Inc., Cupertino, CA (US)

(72) Inventors: Thibaut Weise, Cupertino, CA (US);
Sofien Bouaziz, Cupertino, CA (US);
Atulit Kumar, Cupertino, CA (US);
Sarah Amsellem, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/697,208

(22) Filed: Sep. 6, 2017

Related U.S. Application Data

(60) Provisional application No. 62/384,133, filed on Sep. 6, 2016.

(51) Int. Cl.
*G06K 9/00* (2006.01)
*G06T 13/40* (2011.01)

(52) U.S. Cl.
CPC ..... *G06K 9/00281* (2013.01); *G06K 9/00248* (2013.01); *G06T 13/40* (2013.01)

(58) Field of Classification Search
None
See application file for complete search history.

(56) References Cited

U.S. PATENT DOCUMENTS

| | | | | |
|---|---|---|---|---|
| 2007/0080967 A1* | 4/2007 | Miller | ................ | G06K 9/00208 345/473 |
| 2011/0052081 A1* | 3/2011 | Onoe | ................ | G06K 9/00268 382/203 |
| 2012/0309520 A1* | 12/2012 | Everitt | ................ | G06T 19/20 463/31 |
| 2015/0123967 A1* | 5/2015 | Quinn | ................ | G06T 13/40 345/420 |
| 2017/0286752 A1* | 10/2017 | Gusarov | ................ | G06T 13/40 |

OTHER PUBLICATIONS

Smith, et al., "Comparison of Neural Network and Markov Random Field Image Segmentation Techniques", Review of Progress in Quantitative Nondestructive Evaluation, vol. 11, pp. 717-724, New York, 1992.

(Continued)

*Primary Examiner* — David Perlman
(74) *Attorney, Agent, or Firm* — Baker & Hostetler LLP

(57) ABSTRACT

Techniques are disclosed for creating avatars from image data of a person. According to these techniques, spatial facial attributes of a subject may be measured from an image representing the subject. The measured facial attributes may be matching to a three-dimensional avatar template. Other attributes of the subject may be identified, such as hair type, hair color, eye color, skin color and the like. For hair type, hair may be generated for the avatar by measuring spatial locations of hair of the subject and the measured hair locations may be compared to locations of hair represented by a plurality of hair templates. A matching hair template may be selected from the plurality of hair templates, which may be used in generating the avatar. An avatar may be generated from the matching avatar template, which may be deformed according to the measured spatial facial attributes, and from the other attributes.

19 Claims, 9 Drawing Sheets

(56) References Cited

OTHER PUBLICATIONS

Levin, et al., "A Closed Form Solution to Natural Image Matting", School of Computer Science and Engineering, The Hebrew University of Jerusalem, IEEE Trans Pattern Anal Mach Intell. Feb. 2008;30(2).
Fanelli, et al. "Real Time Head Pose Estimation from Consumer Depth Cameras", Joint Pattern Recognition Symposium, 2011.
Ichim, et al., "Dynamic 3D Avatar Creation from Hand-Held Video Input", ACM Transactions on Graphics (TOG)—Proceedings of ACM SIGGRAPH 2015, vol. 34 Issue 4, Aug. 2015, Article No. 45, New York, NY, USA.
Weise, et al., "Realtime Performance-Based Facial Animation", ACM Transactions on Graphics (TOG)—Proceedings of ACM SIGGRAPH 2011 TOG, vol. 30 Issue 4, Jul. 2011, Article No. 77, New York, NY, USA.
Weise, et al., "Fast 3D Scanning with Automatic Motion Compensation", 2013 IEEE Conference on Computer Vision and Pattern Recognition (2007), Minneapolis, MN, USA, Jun. 17, 2007 to Jun. 22, 2007.
Bouaziz, et al., "Online Modeling for Realtime Facial Animation", ACM Transactions on Graphics (TOG) SIGGRAPH 2013 Conference Proceedings, vol. 32 Issue 4, Jul. 2013, Article No. 40, New York, NY, USA.
Pauly, "Realtime Performance-Based Facial Avatars for Immersive Gameplay", Proceeding MIG '13 Proceedings of Motion on Games, Dublin 2, Ireland—Nov. 6-8, 2013, New York, NY, USA.

\* cited by examiner

200

300

400

500

600

700

800

900

TECHNIQUE FOR CREATING AVATAR FROM IMAGE DATA

CROSS REFERENCE TO RELATED APPLICATIONS

This application benefits from priority of Application No. 62/384,133, filed Sep. 6, 2016, and entitled "Techniques for Creating Avatar from Image Data," the disclosure of which is incorporated herein by its entirety

BACKGROUND

The present disclosure is directed to computer graphics and, in particular, to automated development of avatars from image data of human subjects.

Avatars are used in a variety of computing environments. Avatars typically are graphical icons or figures representing people. They are used in online environments such as computer gaming environments, social media environments and other virtual worlds as identifiers of the people who operate in those environments. Oftentimes, the graphical representations of avatars are quite limited. For example, an authoring tool may permit a user to select from a library of predetermined graphical elements, which requires an author to select a face element, hair element, and the like, from which the avatar is composited. Some other avatar creators appear to develop avatars from manipulations of digital photos of a subject but they tend to involve simplistic modifications of photographic data.

The present inventors believe that users of computing environments may desire to use avatars that look like caricaturized versions of themselves. The avatars would retain a cartoonish element but would resemble the users' own appearance. No known avatar generator can generate avatars in an automated fashion to represent a computer user's own appearance.

DETAILED DESCRIPTION

Embodiments of the present disclosure provide techniques for creating avatars from image data of a person (the "subject"). According to these techniques, spatial facial attributes of a subject may be measured from an image representing the subject. The measured facial attributes may be matching to a three-dimensional avatar template. Other attributes of the subject may be identified, such as hair type, hair color, eye color, skin color and the like. An avatar may be generated from the matching avatar template, which may be deformed according to the measured spatial facial attributes, and from the other attributes.

As noted, hair type may be one such attribute. In an embodiment, hair may be generated for the avatar by measuring spatial locations of hair of the subject and the measured hair locations may be compared to locations of hair represented by a plurality of hair templates. A matching hair template may be selected from the plurality of hair templates, which may be used in generating the avatar.

Figure 1:
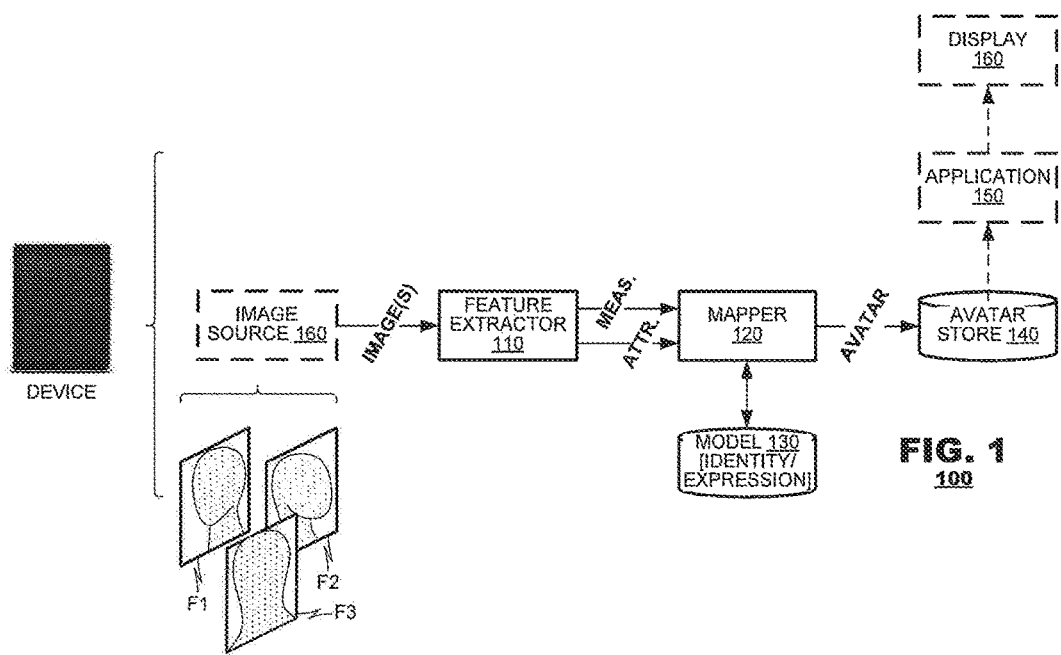
FIG. 1 is a functional diagram of an avatar creator according to an embodiment of the present disclosure.

FIG. 1 is a functional diagram of an avatar creator 100 according to an embodiment of the present disclosure. The avatar creator 100 may include a feature extractor 110, a mapper 120, a data store 130 of facial models, and a data store 140 for a completed avatar. The feature extractor 110 may analyze one or more input images (represented by frames F1-F3) and may measure characteristics of a face represented therein. The mapper 120 may retrieve from the data store 130 a mesh model of a face that most closely matches the facial measurements identified by the extractor 100 and may create an avatar from the mesh model and the attribute data. The avatar may be stored in the data store 140.

The avatar creator 100 may operate as a component of a larger device, for example, a tablet computer (shown), a smart phone, a laptop computer, personal computer, computer server, or a gaming system. The avatar creator 100 may receive images from an image source 160 such as a camera system or a storage device that stores previously-stored images.

The avatar creator 100 may furnish avatar data from data store 140 to other system components, represented by applications 150. These applications 150 may include communication applications, gaming applications, social networking applications and the like, which may include representations of the avatars in rendered application data (not shown) on a display 160 of the device.

During operation, the system 100 may process either a single or multiple images F1-F3 representing a subject. When multiple images are available, it may be ideal to receive images representing a front view of a subject F3, a side view of the subject from the left F1, and a side view of the subject from the right F2. Thus, the different images may contain data representing different portions of the subject's face.

The feature extractor 110 may extract data from the input image(s) F1-F3 representing attributes of the subject's face. The feature extractor 110 may recognize a face from within image content and measure characteristics of the face that correspond to spatial features of the face that are represented in the mesh models of the data store 130. As a coarse example, the feature extractor 110 may measure spatial characteristics of the eyes of the subject—their width, height, shape, spacing from each other, size of the iris, etc. Similarly, the feature extractor 110 may perform measurements to characterize the shape of other facial features, such as the subject's the nose, mouth, ears, jawline, etc., and combinations of these features. Mesh models vary in complexity based on the number of data points that are used to represent the human face with some utilizing several hundred data points and others utilizing several thousand data points. The feature extractor 110 may identify and measure from image data locations of a subset of those mesh data points that can be detected most readily. In practice, the number and type of mesh data points to be measured may be selected by system designers as they tailor the avatar creator 100 for their individual needs.

In an embodiment, the feature extractor 110 may assign an identity classification to the subject based on detected structural features of the subject's face. In an embodiment where mesh models store different mesh representations of faces organized by identity, the feature extractor 110 may attempt to classify input image(s) F1-F3 by such identities. In this regard, an identity may correspond to any set of attributes that tend to distinguish the stored mesh models from each other, such as age, gender, ethnicity and the like. For example, the feature extractor 110 may include a neural network (not shown) that has been trained to recognize such identities from a training set of input images.

In another embodiment, the feature extractor 110 may recognize an expression from each input image F1-F3 based on the measured spatial features of the subject. Typically, some measured data points of a subject whose face is relaxed (or stony-faced) may change when the subject changes to smiling expression. Typically, eye shape, mouth shape, and perhaps eyebrow orientation will change between various different expressions. The feature extractor 110 may assign expression classifications to the image(s) based on the spatial measurements. The feature extractor 110 also may operate according to a machine learning algorithm such as a neural network (not shown) that has been trained to recognize such expressions from a training set of input images. In an embodiment, the feature extractor 110 may assign multiple expression classifications to images that exhibit characteristics of blended expressions (e.g., half-smiling).

In an embodiment, the feature extractor 110 also may identify from the input image(s) F1-F3 characteristics of non-spatial attributes of the subject, for example, the subject's skin color, hair color, hair type, eye color, whether the subject wears glasses, and/or whether the subject has a beard. These attributes also may be used in avatar creation.

The mapper 120 may search the mesh model data store 130 for a mesh representation that most closely matches the data points extracted by the feature extractor 110. The mapper 120 may correlate the extracted data points to the mesh model and, when a match is identified, identify a representation of the matching mesh model which has been deformed according to the measured spatial features extracted from the input image(s) F1-F3. Because the mesh model is developed from a plurality of input image(s) F1-F3 each representing the subject from a respective field of view, it is expected that the mesh representation of the subject will yield a more aesthetically pleasing result than a mesh representation that would be obtained from a single input image.

In performing its search, the mapper 120 may apply classification data that is provided by the feature extractor 110. Thus, in an embodiment where the feature extractor 110 assigns an identity to the image(s) F1-F3, the mapper 120 may determine first whether the mesh model(s) that correspond to the identity classification adequately match the measured spatial features identified by the feature extractor 110; if so, then the mapper 120 may use the mesh model corresponding to the stored identity without evaluating other identities for possible matches.

Similarly, in an embodiment where a feature extractor 110 assigns expression classification(s) to the input image(s) F1-F3, the mapper 120 may deform candidate mesh models from the data store 130 to determine whether they are appropriate matches to the measured spatial features.

The mapper 120 also may create an avatar model from the mesh model and the attribute data from the feature extractor 110. The mapper 120 may build an avatar by adding attributes identified by the feature extractor 110 to the mesh model, such as coloration, hair, beard and/or glasses. The mapper 120 may add accessories (clothing, etc.) either in addition to or to replace accessories identified from image content. The mapper 120 also may deform the mesh representation according to a desired expression of the avatar. The mapper 120 may store the avatar model to the data store 140.

Figure 2:
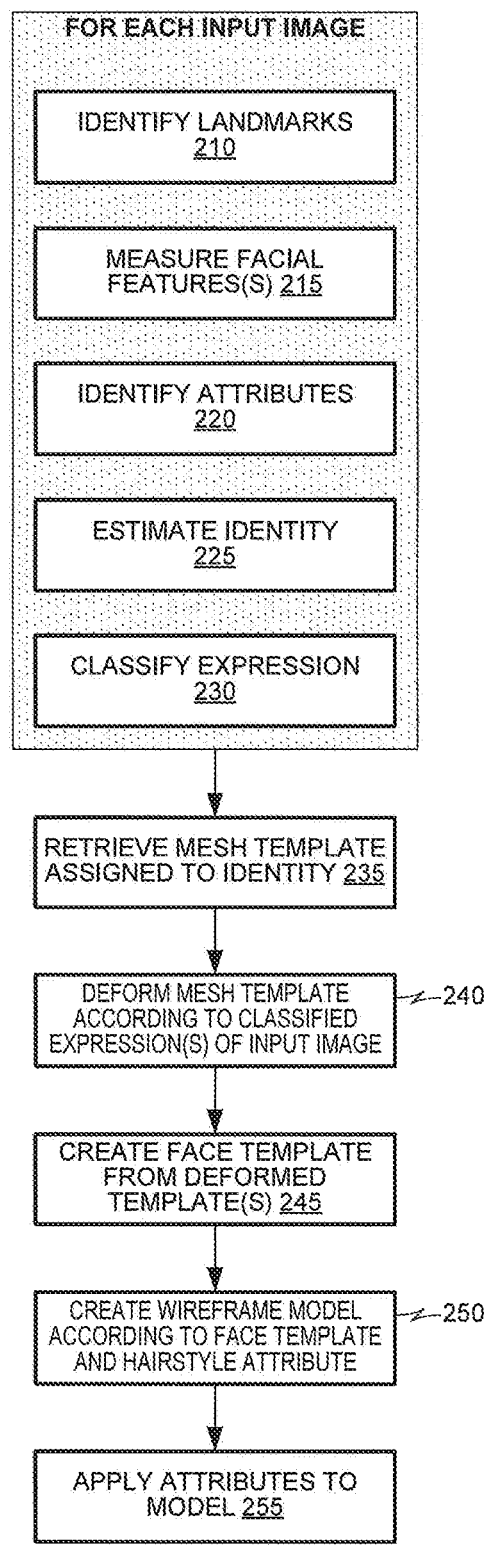
FIG. 2 illustrates a method according to an embodiment of the present disclosure

FIG. 2 illustrates a method 200 according to an embodiment of the present disclosure. The method 200 may begin by operating on one or more input images, identifying landmarks within the image(s) representing predetermined facial features (box 210) and measure facial features represented in the image data using the landmarks as reference points (box 215). The method 200 also may identify attributes of other facial features (box 220) such as eye color, skin color, hair color, hair style, and the like. Optionally, the method 200 may identify an identity of the face represented in the input image (box 225) and classify an expression of the face within the image (box 230).

The method 200 may retrieve a mesh template that is assigned to the identified identity (box 235) and deform the mesh according to the feature measurements taken from the input image(s) (box 240). Thereafter, the method 200 may create a face template from the deformed features (box 245), which may represent a wireframe of the avatar with an expressionless countenance. The method 200 may create a wireframe model of the avatar from the face template and from a hairstyle template that is obtained from the attribute identification (box 250). The method 200 may apply other attributes—for example the eye color, skin color, hair color, etc. identified in box 220 (box 255)—to complete the avatar. The avatar may be stored for later use.

Figure 3:
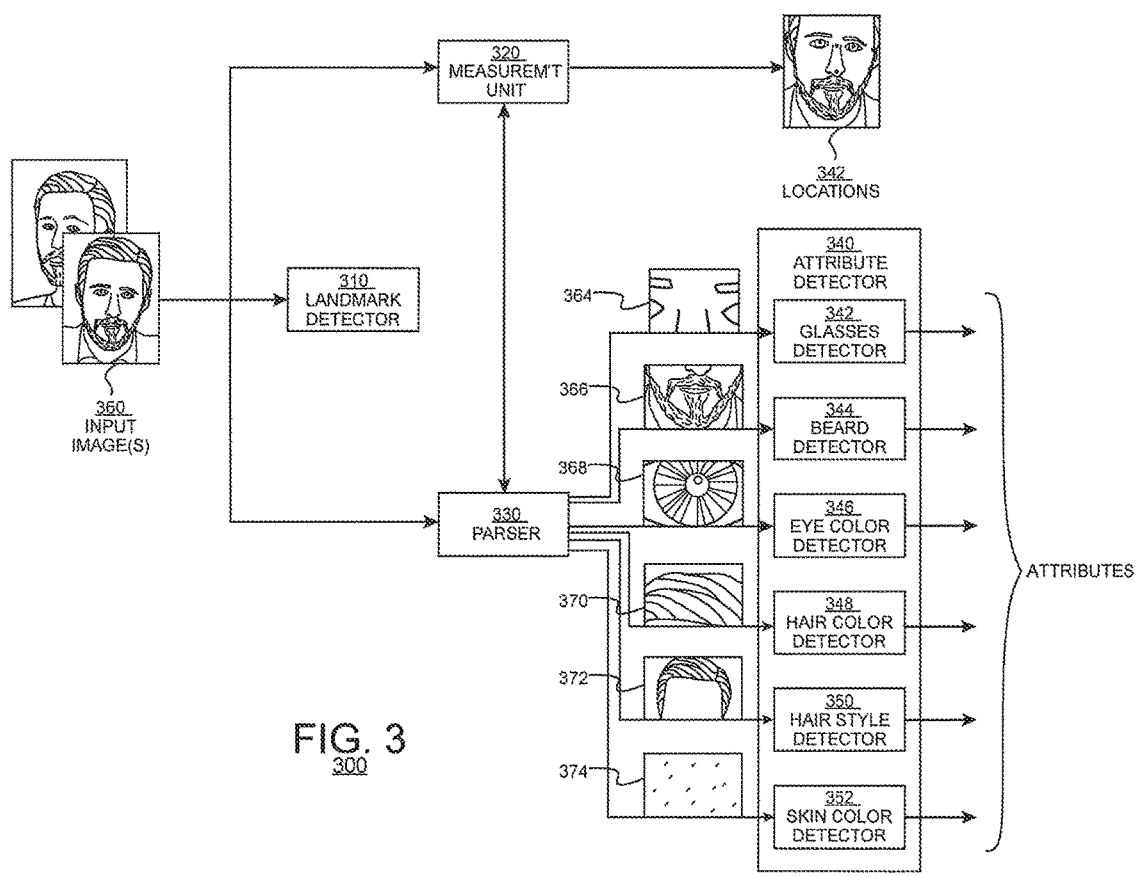
FIG. 3 illustrates operation of a feature extractor according to an embodiment of the present disclosure.

FIG. 3 illustrates operation of a feature extractor 300 according to an embodiment of the present disclosure. The feature extractor may include a landmark detector 310, a measurement unit 320, an image parser 330 and a plurality of attribute detectors (represented collectively as 340). The landmark detector 310 may identify predetermined facial characteristics from content of input image(s) 360, such as the eyes, nose, mouth, ears, outline of head, etc. Depending on the angle and/or appearance of the subject within the image content, it may not be possible to identify all candidate landmarks from all input images 360. For example, when a subject's head is turned, an ear may be obscured. Similarly, ears may be obscured in images of subjects whose hair that falls over their ears. The landmark detector 310 may output data identifying the facial object(s) that are successfully identified from image content of each image 360 and the locations in image content where they appear.

The measurement unit 320 may measure characteristics of the faces identified in image content. Thus, the measurement unit 320 may measure sizes and shapes of the eyes, nose, mouth, eyebrows and head outlines that are identified by the landmark detector 310. These measurements may generate location data points 362 of various elements of the landmarks detected by the landmark detector 310. These location data points 362 may be matched to mesh model nodes in a later processing stage.

The parser 330 may extract patches 364-372 of image content from the source image 360 corresponding to facial regions on which the respective attribute detectors may work. Thus, in an example where an attribute detector 340 includes a glasses detector 342, the parser 330 may extract a patch 364 of image content in a region between the eyes, from which the glasses detector 342 may determine whether the content includes content representing eyeglasses (for example, a bridge of the eyeglasses which should appear in the region). In an image representing a side image of a face, the parser 330 may extract a patch of image content extending from an eye to an ear (not shown), from which the glasses detector 342 may determine whether the image content includes content presenting temples of the eyeglasses. In a similar manner, the parser 330 may extract patches 366-372 representing image content of other facial attributes to be detected.

The attribute detector 340 may include a variety of detectors that identify characteristics of the input image(s) 360 that may be useful to identify to create an avatar. In the example, shown in FIG. 3, the attribute detector 340 may include a glasses detector 342, a beard detector 344, an eye color detector 346, a hair color detector 348 and a skin color detector 350. The glasses detector 342 may estimate whether the subject in the input image(s) 360 is wearing glasses. The beard detector 344 may estimate whether the subject in the input image(s) 360 is wearing a beard. The eye color detector 346, the hair color detector 348, and the skin color detector 352 may estimate the colors of the subject's eyes, hair and skin, respectively. The hair style detector 350 may estimate a style of hair worn by the subject represented in the input image(s) 360. In an embodiment, other attribute detectors (not shown) may be provided to detect the presence of other attributes of the subject such as whether hair and/or headwear are detected on the subject. Further attribute detectors (also not shown) may be provided to estimate other characteristics of the subject such as hair length, facial hair length, facial hair color and glasses type. Thus, the number and type of attribute detectors 340 may be tailored to suit individual application needs.

The glasses detector 342 and the beard detector 344 may generate outputs indicating whether glasses and/or beards are detected in the input image(s) 360. Thus, these detectors 342, 344 may generate binary output signals indicating the presence or absence of these features in the input image(s). Where multiple input images are available for a common subject, the glasses detector 342 and/or the beard detector 344 may generate probability scores individually for the image indicating a likelihood that glasses and/or a beard was detected. Following analysis of the images individually, the glasses detector 342 and/or the beard detector 344 may generate output signals representing a final determination of whether glasses and/or a beard is detected. For example, a glasses detector 342 may average the probability scores obtained from a plurality of input images, then compare the averaged score to a threshold to develop a final decision of whether glasses are present in the input images 360 or not. Similarly, the beard detector 342 may average the probability scores obtained from a plurality of input images, then compare the averaged score to another threshold to develop a final decision of whether the subject of the input images 360 is wearing a beard or not.

The glasses detector 342 and/or beard detector 344 may utilize a variety of techniques to determine whether the subject of the input image(s) is wearing glasses and/or a beard. In one embodiment, the detectors 342, 344 may identify image content that contrasts with content representing the subject's skin color, then determine whether the contrasting image content has a shape that is consistent with glasses and/or a beard, respectively. In another embodiment, the detectors 342, 344 may employ machine learning algorithms, such as neural network processing algorithms, which have been trained from other image content to recognize glasses and/or beards, respectively.

The eye color detector 346, a hair color detector 348 and a skin color detector 350 may identify colors of the eyes, hair and skin, respectively, of the subject represented in the input image(s). Such attributes may vary from image to image with variations in image capture, such as exposure variations, lighting variations and the like. The detectors may perform color extraction individually on the input images, then aggregate the extracted color information into a final classification, for example, by averaging. In an embodiment where input images 360 can be processed with access to metadata that describe image capture conditions (such as the common EXIF files), the detectors 346, 348 and 352 may apply corrective image processing techniques to normalize variations in image content before performing detection.

Figure 4:
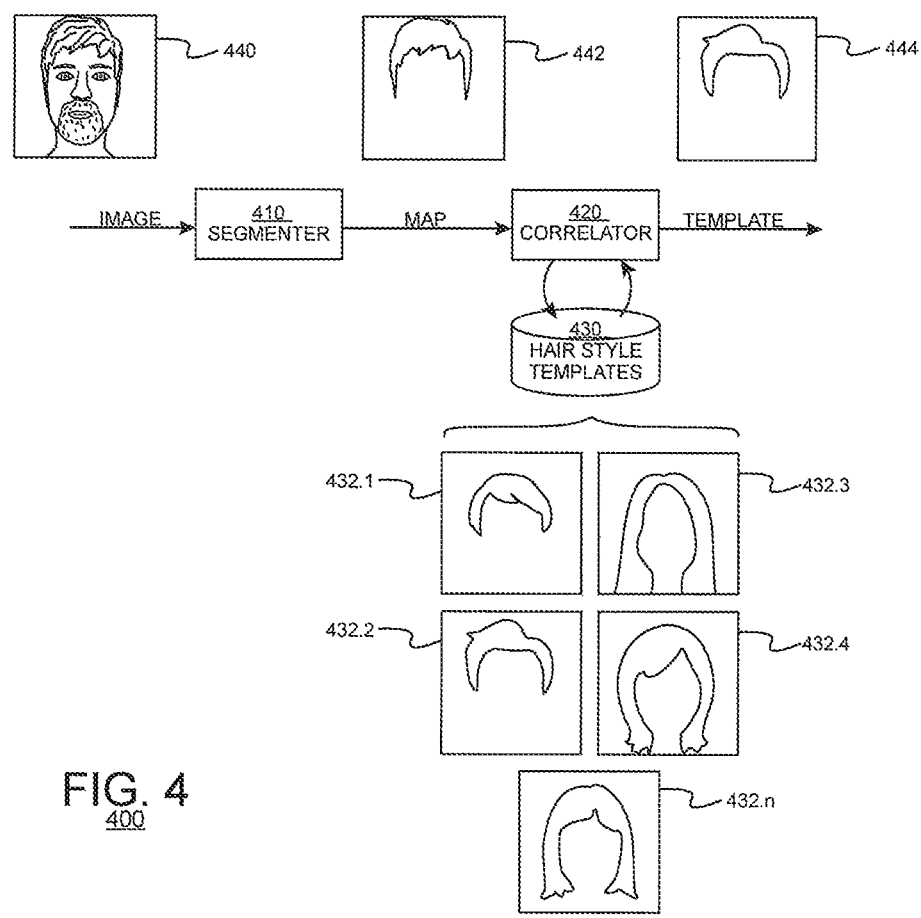
FIG. 4 illustrates a functional block diagram of a hair style detector according to an embodiment of the present disclosure.

FIG. 4 illustrates a functional block diagram of a hair style detector 400 according to an embodiment of the present disclosure. The hair style detector 400 may include a segmenter 410, a correlator 420 and a data store 430 storing a plurality of hair style templates. The segmenter 410 may distinguish portions of content in an input image 440 that represent the subject's hair from other portions of content. The correlator 420 may estimate which of a plurality of stored templates of avatar hairstyles is a best fit for the hair detected in the input image 440. The data store 430 may store data representing the hair style templates that the correlator 420 may use for its estimation. The correlator 420 may output data identifying a template that is detected as a best match.

The segmenter 410 may assign, on a pixel by pixel basis of an input image, a value representing the segmenter's 410 estimation of whether the pixel represents the subject's hair or some other content. The segmenter 410 may output values at each pixel location representing the determination. In one embodiment, the pixels may be assigned binary values (a binary "map") representing a classification of each pixel as representing "hair" or "not hair." Alternatively, the pixels may be assigned probabilistic values in a numerical range (for example, between 0 and 1) representing a degree of confidence that the pixel represents "hair" or "not hair." In either case, the segmenter 410 may output a pixel-based map 442 with the classification values.

The templates 432.1-432.n also may be represented as maps that distinguish pixel locations that contain hair from pixel locations that do not. The correlator 420 may comparison the map 442 obtained from the input image to the templates 432.1-432.n to identify a template that creates a best match.

The correlator 420 may operate according to a variety of matching techniques. In one embodiment, the correlator 420 may perform pixel-wise comparisons between the map 442 obtained from the input image and each of the templates 432.1-432.n. Comparisons may be performed counting the number of co-located pixels from the map 442 of the input image and from a candidate template (say 432.2) that have a common classification (e.g., pixels from both images are classified as "hair" or pixels from both images are classified as "not hair"). In embodiments where the map 442 and the templates 432.1-432.n each represent their classifications as binary values, the comparison may be performed by a logical XOR of the co-located pixels:

$$\text{Score}_i = \Sigma_{\text{all } x,y} p_{map}(x,y) \oplus p_{temp_i}(x,y).$$

where i represents the template being tested, $p_{map}$ represents the pixel classification from map 442 at location x,y, and $p_{temp_i}$ represents the pixel classification from the template i.

In embodiments where pixel classifications are given as probabilistic values in a range from 0 to 1, the comparison may be performed by a comparison of true and complementary values of the co-located pixels:

$$Score_i = \Sigma_{all\ x,y} p_{map}(x/y) \times p_{temp_i}(x/y) + \Sigma_{all\ x,y} [1-p_{map}(x/y)] \times [1-p_{temp_i}(x/y)],$$

where, again, i represents the template being tested, $p_{map}$ represents the pixel classification from map 442 at location x,y, and $p_{temp_i}$ represents the pixel classification from the template i.

In either case, the comparisons may generate respective scores that indicate levels of correspondence between the input image 440 and the stored templates 432.1-432.n. The correlator 420 may rank the templates based on their scores and select a highest-ranked template as a basis for generating an avatar. The correlator 420 may output the template to the mapper 120 (FIG. 1).

In another embodiment, a correlator 420 may select a template based on detection of a shape of a subject's hair in input image data 440 and comparison to shapes represented by the templates 432.1-432.n.

Figure 5:
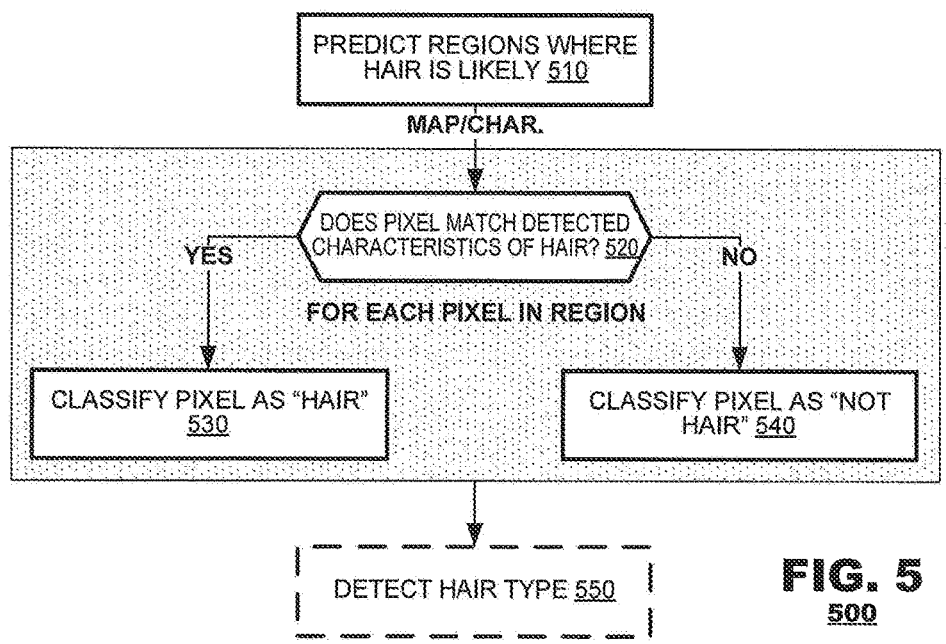
FIG. 5 illustrates a hair segmentation method according to an embodiment of the present disclosure.

FIG. 5 illustrates a hair segmentation method 500 according to an embodiment of the present disclosure. The method 500 may begin by analyzing input image data to predict region(s) of the image where hair is likely to be represented (box 510). The analysis may identify both regions of the image where hair was detected as likely and also characteristics of the detected hair (for example, the color of hair). Thereafter, the method 500 may perform an analysis of each pixel in the image to classify the image either as "hair" or "not hair." At each pixel, the method 500 may determine whether the pixel's image content matches the characteristics of detected hair (box 520). If so, the method may classify the pixel as being "hair" (box 530). If not, the method 500 may classify the pixel as "not hair" (box 540).

Figure 6:
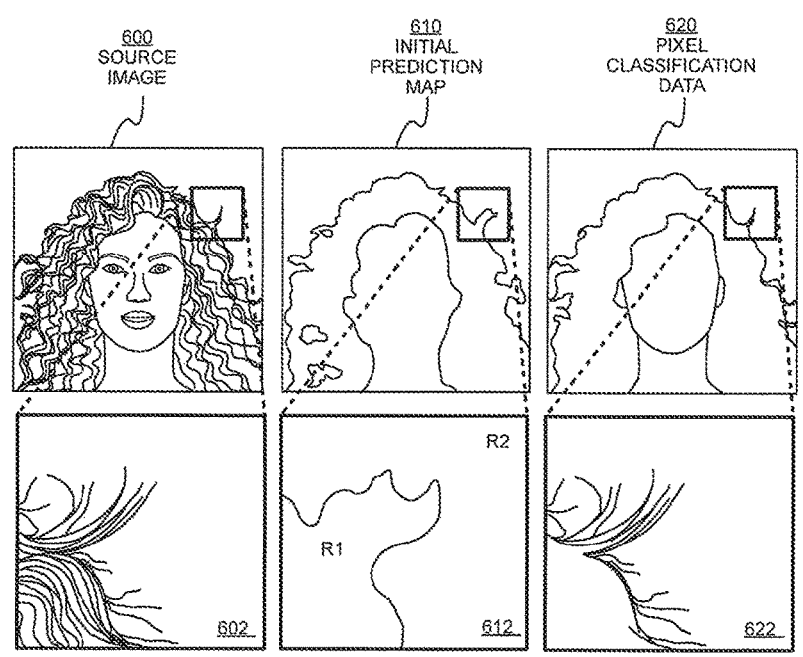
FIG. 6 illustrates exemplary image data for use with embodiments of the present disclosure.

FIG. 6 illustrates exemplary image data 600 on which the method 500 of FIG. 5 may operate. More particularly, FIG. 6 illustrates an exemplary source image 600. Inset 602 illustrates content of the source image 600 zoomed to a level where individual pixels can be distinguished from each other.

When the method 500 predicts regions in which hair is likely to be found (box 510), it may generate an initial prediction map 610 that indicates probabilities that hair is found in a respective region. The initial prediction map 610 may be generated from a coarse evaluation of the image, from which the probabilities are created. Following creation of the initial prediction map 610, image characteristics of the hair may be extracted from the image, along with image characteristics of regions that are determined not likely be hair (such as background image content). Then, image content of individual pixels from the source image 600 may be compared to content of the initial prediction map 610 and a final classification map 620 may be generated.

In FIG. 6, insets 612 and 622 represents portions of the initial prediction map 610 and the classification map 620, respectively, that correspond to the image content of inset 602 from the source image 600. Inset 612, for example identifies regions in hair is identified as probably likely to appear (R1) and probably likely not to appear (R2). Pixel in the region R1 that have characteristics that match the detected characteristics of the hair (here, dark hair) may be classified as "hair" and pixel in the region R1 that have characteristics that differ from that the detected characteristics of the hair (here, the white background) may be classified as "not hair." Inset 622 represents the result of this comparison.

The initial prediction map 610 may be generated by a variety of techniques. In a first embodiment, the initial prediction map 610 may be generated from neural network processing of image content at a variety of image granularities.

Figure 7:
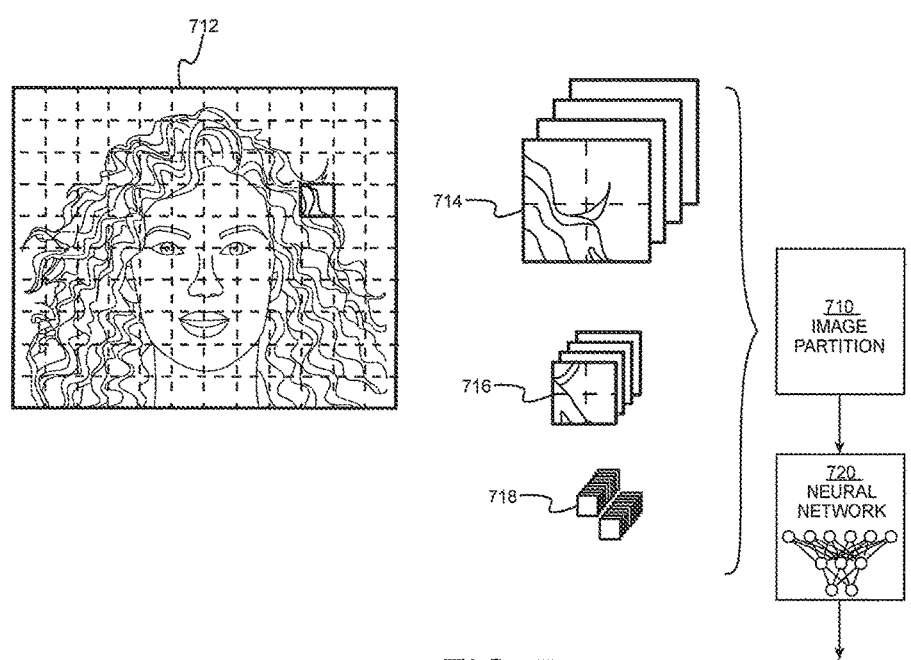
FIG. 7 schematically illustrates a process of generating an initial prediction map according to an embodiment of the present disclosure

FIG. 7 schematically illustrates one such process. An image partitioning unit 710 may partition an input image 712 into arrays 714, 716, 718 (called "patches," for convenience) of different sizes. A neural network 720 may process each patch and estimate whether the patch contains content representing hair or not. The process may proceed recursively with the neural network 720 operating on patches of increasingly smaller size. For example, the image partitioning process may partition an input image into patches of a first size (say, 64×64 pixels) and estimate the presence of hair in each of the first sized patches. Thereafter, each of the first sized patches may be partitioned again (into 32×32 pixel patches, for example) and the neural network's estimation may be repeated. The process may repeat on increasingly smaller sized patches. The output of each process iteration may refine the probability estimates of the initial prediction map 610 (FIG. 6). For example, system designers may design the segmenter 410 (FIG. 4) to process patches down to only a few pixels on each side (say, 4×4 or 2×2 pixel arrays). The output of the recursive process may generate an initial prediction map 610 such as shown in FIG. 6.

The neural network 720 may be provisioned in a variety of ways. For example, it may be convenient to employ convolutional neural networks, such as fully convolutional neural networks, Markov Random Field neural networks or Gaussian Random Field neural networks. The neural network 720 may be trained to recognize hair from a training set of patches at the different patch sizes.

Returning to FIG. 5, once image content has been classified as "hair" or "not hair," the method 500 may analyze the input image further to assess characteristic such as hair "type" (box 550), for example whether the hair is straight, curly or frizzy. The method 500 may search for features of each type of hair within the image data to characterize the hair in this manner. Using the source image 600 of FIG. 6 as an example, the method 500 may search for voids in a region occupied by the hair, which may suggest that hair type is "curly." Similarly, the method 500 may identify highlights within image data corresponding to the hair to identify contours of the hair. A relatively small number of highlights may indicate that hair type should be "straight," whereas a relatively large number of highlights may indicate that hair is "curly." Similarly, relatively uniform direction of highlights may indicate that hair is "straight" but relative non-uniformity of the highlights may indicate that hair is "curly." And further, a trained neural network may be used to apply such classifications.

Returning to FIG. 4, in an embodiment, the template data store 430 may store tags (not shown) in association with each of the templates 432.1-432.n that identify the respective templates according to the characterizations that are detected in box 540 (FIG. 5). Thus, templates 432.1-432.n may be characterized as straight, curly, frizzy, etc. just as hair in an input image would be detected. The correlator 420 may filter its searches of the data store 430 using tags supplied by the segmenter 410 to limit the number of templates that are to be compared. In this manner, performing such filtering prior to a search for a matching template may conserve resources expended by a correlator.

In another embodiment, classification of hair type may be used by a mapper 120 (FIG. 1) to alter representation of hair in an avatar. For example, when hair in an input image is detected as "straight," the mapper 120 may apply effects (typically, texture and/or coloration) to mimic straight hair in the avatar. Alternatively, when hair in an input image is detected as "curly" or "frizzy," the mapper 120 may apply effects to the hair to mimic the curly or frizzy hair.

Figure 8:
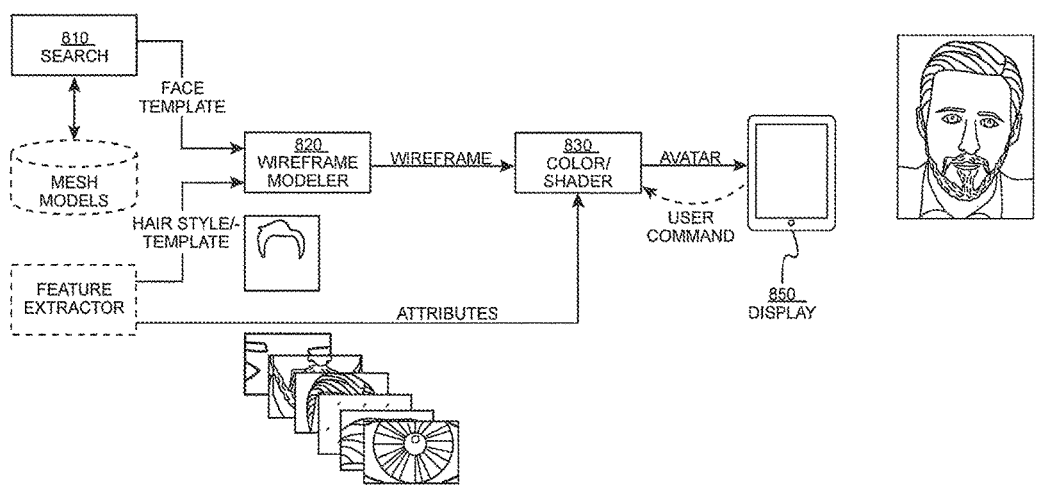
FIG. 8 illustrates a functional block diagram of a mapper according to an embodiment of the present disclosure.

FIG. 8 illustrates a functional block diagram of a mapper 800 according to an embodiment of the present disclosure. The mapper 800 may include a search unit 810, a modeler 820 and colorizer/shader 830. The search unit 810 may search for a match between stored mesh models and the facial measurements identified by the feature extractor 110 (FIG. 1). The modeler 820 may develop an aggregate wireframe of the avatar working from the mesh representation output by the mapping unit (FIG. 1) and from the hair style identified by the feature extractor (FIG. 1). The colorizer/shader 830 may apply attributes to the wireframe as detected by the feature extractor, applying hair color, eye color, skin color and beards and eyeglasses as detected by the feature extractor. The colorizer/shader 830 may output a completed representation of the avatar which may be stored for later use.

In an embodiment, the mapper 800 may output a draft representation of the avatar to a display 850 for review and approval by an operator. For example, the operator may cause the mapper 800 to alter either the applied hair style or face template (or both). In response to a user command to change either representation, the mapper 800 may cause the mapper or feature extractor as necessary to provide another face or hairstyle template. The mapper 800 may repeat its operation with new data and render a new avatar. Similarly, the operator may identify an expression to be applied to the avatar and, in response to the expression input, the wireframe modeler 820 may deform the mesh model according to the identifies expression and rendering may be repeated. This process may repeat until a user validates the draft avatar for future use.

In an embodiment, the mapper 800 may transform the matching mesh model to an alternate mesh representation of the subject. For example, the search unit 810 may search for a match between the extracted features of the subject and a first set of mesh model that represent different identities as described above. Once a matching mesh model is identified, a second mesh model may be retrieved representing a desired caricature of the subject. The mapper 800 may store a second set of mesh models representing different caricatures (for example, cartoon characters and the like). The mapper 800 may deform the first matching mesh model to match measured facial features of the subject, then deform the caricature mesh model according to the mesh points derived from the deformed first mesh model.

In this embodiment, colorization, lighting and other visual content of the avatar may be derived both from attributes of the subject and from attributes assigned to the mesh model. For example, hair, skin color and eye color of a humanoid character may be derived from image data of the subject but clothing, hair style and certain facial attributes (elfin ears, eyebrows) may be derived from character attributes. But, a different character (say, an animal or mythological creature) may have "skin" and eye coloring provided from the character attributes and other features provided from image data of the subject. Here, again, system designers may tailor the balance between contribution of subject attributes and character attributes to fit their own needs.

In another embodiment, the first set of facial models (data store 130 of FIG. 1) may represent cartoonish versions of the identities directly. Such mesh models may contain a smaller number of mesh nodes than are provided for photo-realistic representations of human beings, for example,—750 nodes for the avatar as compared to 3,000 nodes or more for photo-realistic images. In such an embodiment, several mesh models may be provided per identity, each differing based on content corresponding to the characters represented by the mesh. Once a matching mesh model is identified, it may be used in a first representation of an avatar. User commands may cause other mesh models associated with the identity to be used, which allows an operator to cycle among a variety of caricatures as it selects a representation to be used.

The foregoing discussion has described components of an avatar creator. Commonly, these components are provided as electronic devices. They can be embodied in integrated circuits, such as application specific integrated circuits, field programmable gate arrays and/or digital signal processors. Alternatively, they can be embodied in computer programs that execute on personal computers, computer servers, gaming systems, or mobile computing systems such as tablet computers, laptop computers, smart phones, or personal media players. In such applications, the computer programs may be stored in computer readable storage devices such as electrically-, magnetically- and/or optically-based storage media and executed by processors within those device. And, of course, these components may be provided as hybrid systems that distribute functionality across dedicated hardware components and programmed general purpose processors, as desired.

Figure 9:
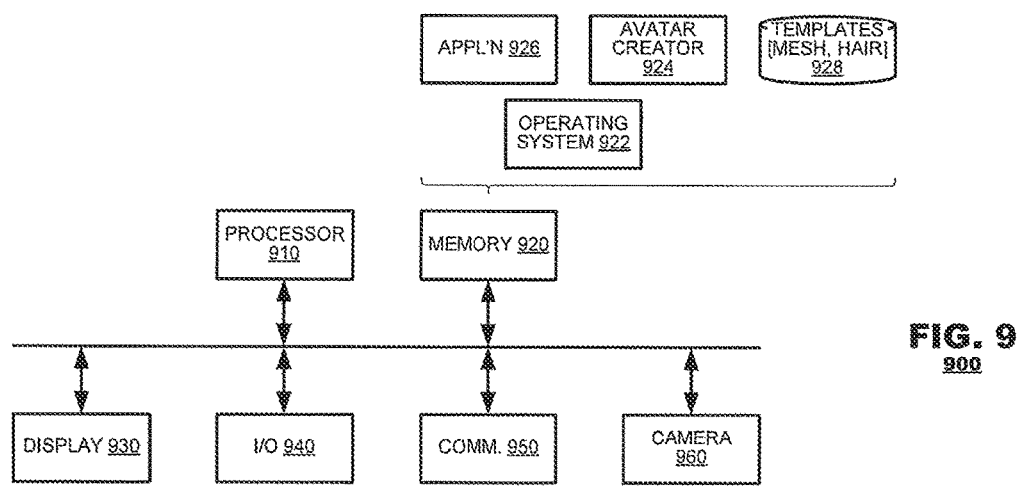
FIG. 9 is a block diagram of a computer system suitable for use as an avatar creator.

FIG. 9 is a block diagram of a computer system 900 suitable for use as an avatar creator. The computer system 900 may include a processor 910, a memory system 920, a display 930, input/output system 940, a communications system 950 and a camera system 960. The memory 920 may store program instructions and data representing various programming constructs used by the computer system 900, such as an operating system 922, the avatar creator 924 and other applications 926. The memory 920 also may store data 928 used by the avatar creator 924, such as the mesh models and hair style templates discussed hereinabove. The memory also may store other data items (not shown) such as digital images captured by the camera system 960.

During operation, the processor 910 may execute program instructions representation the avatar creator 924 and may perform the operations described herein to process image data and generate avatar(s) therefrom. In doing so, the processor 910 may access template data 928 used by the avatar creator 924 in its operations. Moreover, the processor 910 may access image data, either directly from the camera system 960 or from the memory system 920 to process image data of the subject. When the processor 910 creates avatar data, it may store the avatar data in the memory 920.

Several embodiments of the disclosure are specifically illustrated and/or described herein. However, it will be appreciated that modifications and variations of the embodiments are covered by the above teachings and within the purview of the appended claims without departing from the spirit and intended scope of this discussion.

We claim:

1. An image processing method, comprising:
   measuring spatial facial attributes of a subject from an image representing the subject;
   assigning an expression classification to the subject based on the measured spatial facial attributes;

matching the measured facial attributes to a three-dimensional avatar template, wherein the matching comprises:
deforming candidate avatar templates according to the expression classification, and
comparing each of the deformed candidate avatar templates to the measured spatial facial attributes;
identifying other attributes of the subject; and
generating an avatar from a selected avatar template deformed according to the measured spatial facial attributes and from the other attributes, the selected avatar template selected by the matching.

2. The method of claim 1, further comprising:
assigning an identity classification to the subject based on the measured spatial facial attributes,
wherein the matching comprises matching the identity classification of the subject to identity classifications of a plurality of candidate avatar templates.

3. The method of claim 1, wherein the identifying other attributes comprises:
measuring spatial locations of hair of the subject; and
matching the measured hair locations to one of a plurality of hair templates.

4. The method of claim 1, wherein the identifying other attributes comprises identifying whether the image data of the subject includes data representing eyeglasses.

5. The method of claim 1, wherein the identifying other attributes comprises identifying whether the image data of the subject includes data representing a beard.

6. The method of claim 1, wherein the identifying other attributes comprises identifying an eye color of the subject.

7. The method of claim 1, wherein the identifying other attributes comprises identifying a hair color of the subject.

8. The method of claim 1, wherein the identifying other attributes comprises identifying a skin color of the subject.

9. The method of claim 1, wherein:
the generating comprises transforming the deformed avatar template to a second template representing a selected character, and
the avatar possesses attributes derived from the other attributes and attributes defined for the selected character.

10. An avatar generation system, comprising:
a storage device storing a plurality of mesh models for human faces;
a feature extractor, having an input for image data and outputs for data representing: measured spatial features of a subject of the image, attributes of other features of the subject, and an expression classification assigned to the subject based on the measured spatial facial features;
a search unit communicatively coupled to the storage device, having an input for the measured spatial feature data and the assigned expression classification, and having an output for mesh model data deformed according to the measured spatial feature data, wherein the mesh model data is selected by:
deforming candidate avatar templates according to the expression classification, and
determining which of the candidate avatar templates matches the measured spatial feature data of the subject; and
an avatar generator, having an input for the deformed mesh model data and for the attribute data and having an output for avatar data, the avatar data integrating the deformed mesh model data and the attribute data.

11. The method of claim 10, further comprising:
assigning an identity classification to the subject based on the measured spatial facial attributes,
wherein the matching comprises matching the identity classification of the subject to identity classifications of a plurality of candidate avatar templates.

12. The method of claim 10, further comprising:
identifying whether the image data of the subject includes data representing eyeglasses, and
if so, the generating includes representing eyeglasses as part of the avatar.

13. The method of claim 10, further comprising:
identifying whether the image data of the subject includes data representing a beard, and
if so, the generating includes representing a beard as part of the avatar.

14. The method of claim 10, further comprising identifying an eye color of the subject, wherein the generating includes representing the eye color of the subject as part of the avatar.

15. The method of claim 10, further comprising identifying a hair color of the subject, wherein the generating includes representing the hair color of the subject as part of the avatar.

16. The method of claim 10, further comprising identifying a skin color of the subject, wherein the generating includes representing the skin color of the subject as part of the avatar.

17. The method of claim 10, wherein:
the generating comprises transforming the deformed avatar template to a second template representing a selected character, and
the avatar possesses attributes derived from the attributes of the subject and attributes defined for the selected character.

18. An image processing method, comprising:
measuring spatial facial attributes of a subject from an image representing the subject;
assigning an expression classification to the subject based on the measured spatial facial attributes;
matching the measured facial attributes to one of a plurality of avatar templates, wherein the matching comprises:
deforming candidate avatar templates according to the expression classification, and
comparing each of the deformed avatar templates to the measured spatial facial attributes;
measuring spatial locations of hair of the subject; and
matching the measured hair locations to one of a plurality of hair templates; and
generating an avatar from a selected avatar template deformed according to the measured spatial facial attributes and from the matching hair template, the selected avatar template selected by the matching.

19. An avatar generation system, comprising:
a storage device storing a plurality of mesh models for human faces;
a feature extractor, having an input for an image and outputs for data representing measured spatial features of a subject of the image, attributes of other features of the subject, and an expression classification assigned to the subject based on the measured spatial facial features;
a hair style detector having an input for the image data and an output for hair style template data; the hair style detector including storage for a plurality of hair style templates;

a search unit communicatively coupled to the storage device, having an input for the measured spatial feature data and the assigned expression classification, and having an output for mesh model data deformed according to the measured spatial feature data, wherein the mesh model data is selected by:

deforming candidate avatar templates according to the expression classification, and determining which of the candidate avatar templates matches the measured spatial feature data of the subject; and an avatar generator, having an input for the deformed mesh model data, for the hair style template data, and for the attribute data and having an output for avatar data, the avatar data integrating the deformed mesh model data and the attribute data.

* * * * *